Figure 1:
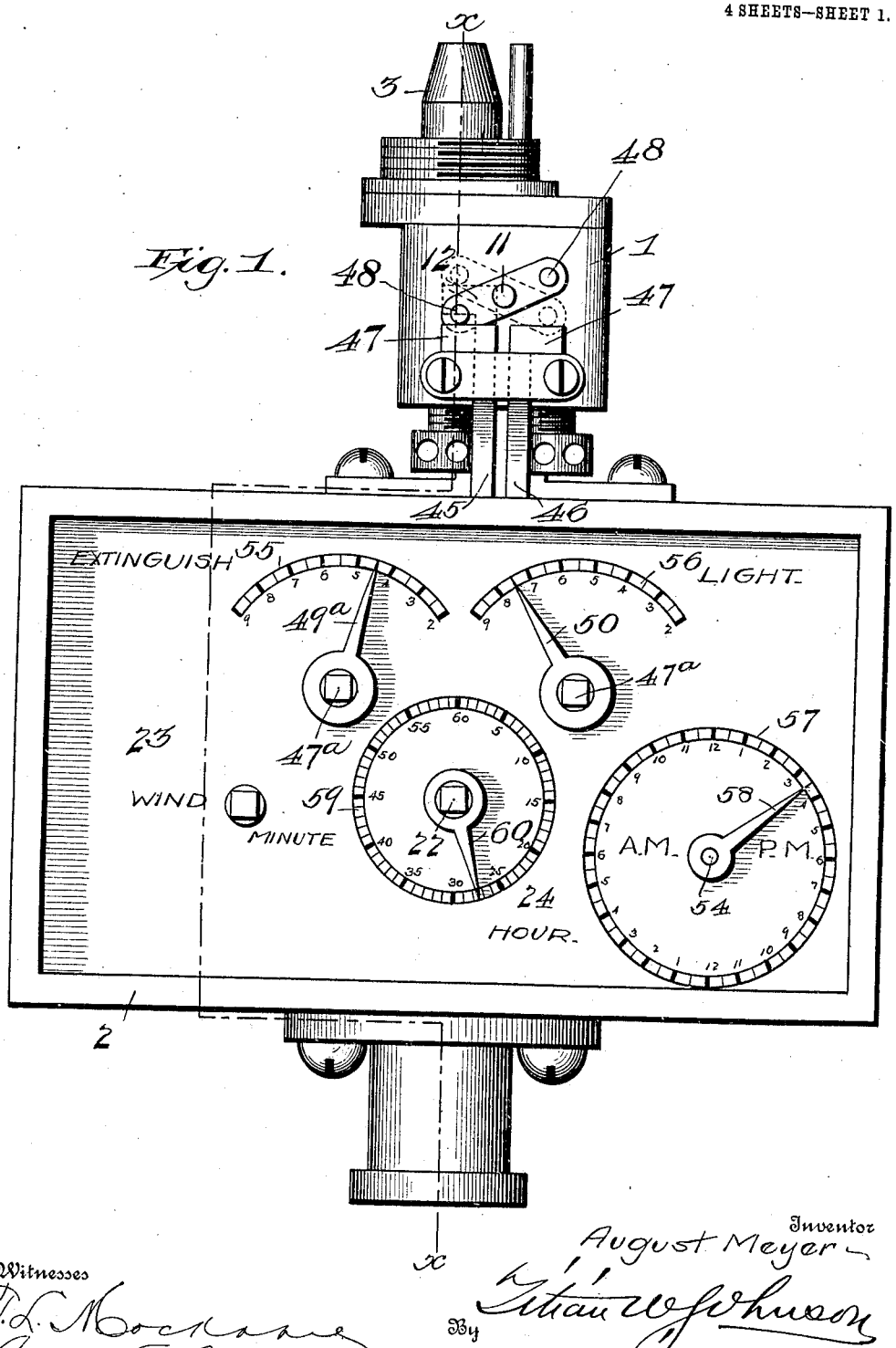

No. 871,605. PATENTED NOV. 19, 1907.
A. MEYER.
GAS LIGHTING AND EXTINGUISHING DEVICE.
APPLICATION FILED NOV. 4, 1905. RENEWED APR. 4, 1907.

4 SHEETS—SHEET 4.

Witnesses
Inventor
August Meyer
By
Attorney

UNITED STATES PATENT OFFICE.

AUGUST MEYER, OF BALTIMORE, MARYLAND, ASSIGNOR TO AUTOMATIC GAS LIGHTING COMPANY, OF BALTIMORE, MARYLAND, A CORPORATION OF DELAWARE.

GAS LIGHTING AND EXTINGUISHING DEVICE.

No. 871,605.  Specification of Letters Patent.  Patented Nov. 19, 1907.

Application filed November 4, 1905, Serial No. 285,891. Renewed April 4, 1907. Serial No. 366,432.

*To all whom it may concern:*

Be it known that I, AUGUST MEYER, citizen of the United States, residing at Baltimore city, in the State of Maryland, have invented certain new and useful Improvements in Gas Lighting and Extinguishing Devices, of which the following is a specification.

This invention relates to new and useful improvements in gas lighting and extinguishing devices, and more especially to a device of this character adapted to be operated at pre-determined times by a suitable mechanism, to light and extinguish street gas lamps.

Experience has demonstrated in this art that the difficulties encountered in the production of a practical lighter and extinguisher, are more often chargeable to the construction of the burner, than to the time mechanism, on account of the burner being either very complicated and requiring very considerable power to open and close the same, on account of its liability to stick as a result of gas deposits, or the susceptibility of the parts to the influences of heat and cold. With a view of overcoming the difficulties and obstacles just mentioned, I have paid in the invention about to be described more attention to the construction of the burner than to the mechanism actuated through the clock or time mechanism for opening and closing the valve, although I desire it understood at the outset that my invention as a whole consists in the novel devices and their relative arrangement, which will be hereinafter described.

The primary object of the invention is to so construct the valve that it will be easily and reliably operated to light and extinguish the lamp by a very slight movement of the parts which are so constructed that the power of the time mechanism will be more than ample to effect the opening and the closing of the valve.

A further object of the invention is to so combine the burner and time mechanism that it will form one concrete and compact device which may be conveniently attached to the threaded portion of the gas pipe, to which the ordinary burner is commonly applied.

The burner about to be described belongs to that class in which a "pilot burner" or by-burner is employed to maintain a small flame by which the main body of the gas is ignited as it issues from the main burner.

My invention does not relate to the time mechanism proper save in so far that some of its parts are extended or added to so as to coöperate with a novel mechanism through which the valve is opened and closed, and therefore I have only illustrated in detail, such of the mechanism as I add to the time mechanism.

Figure 2:
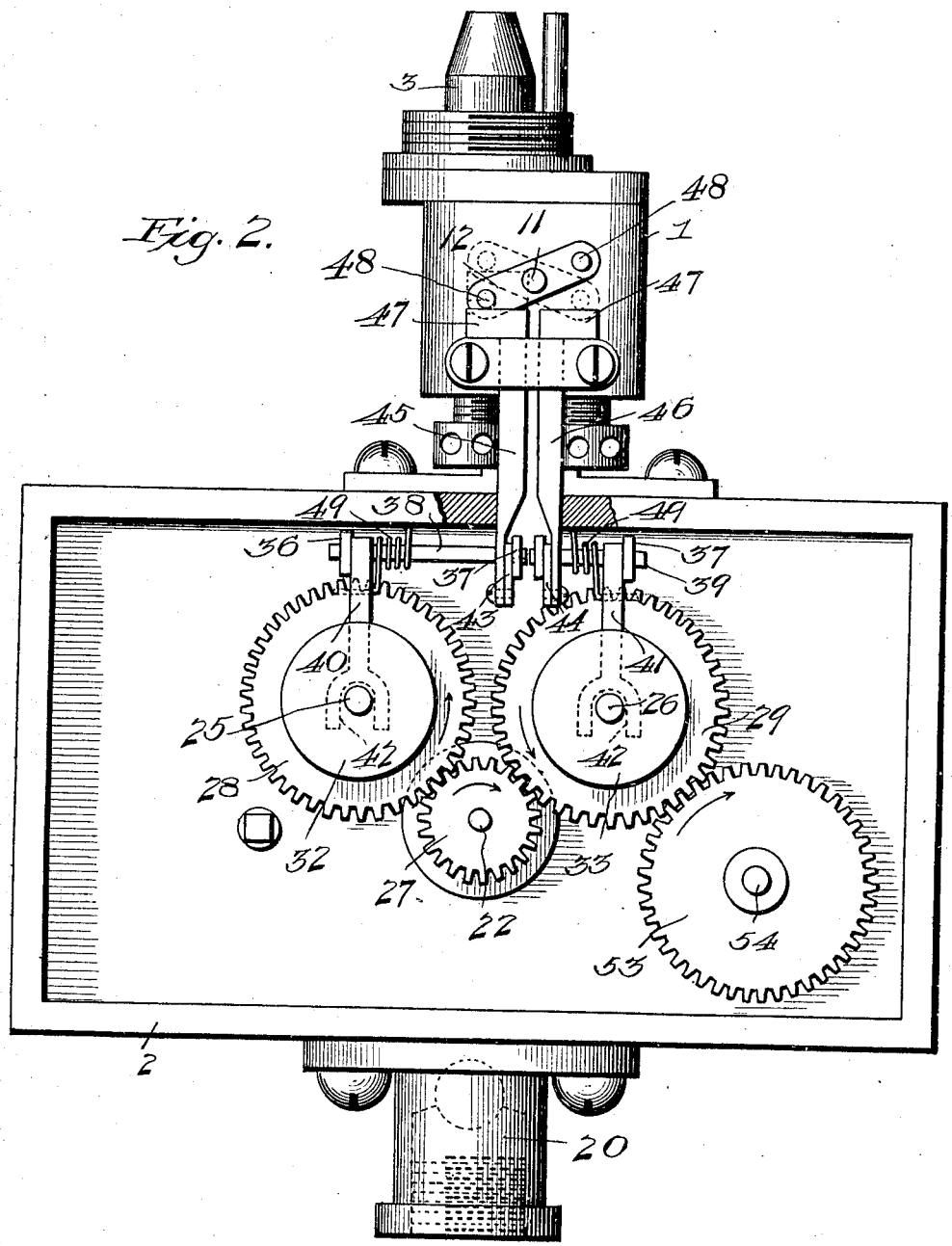
Figure 3:
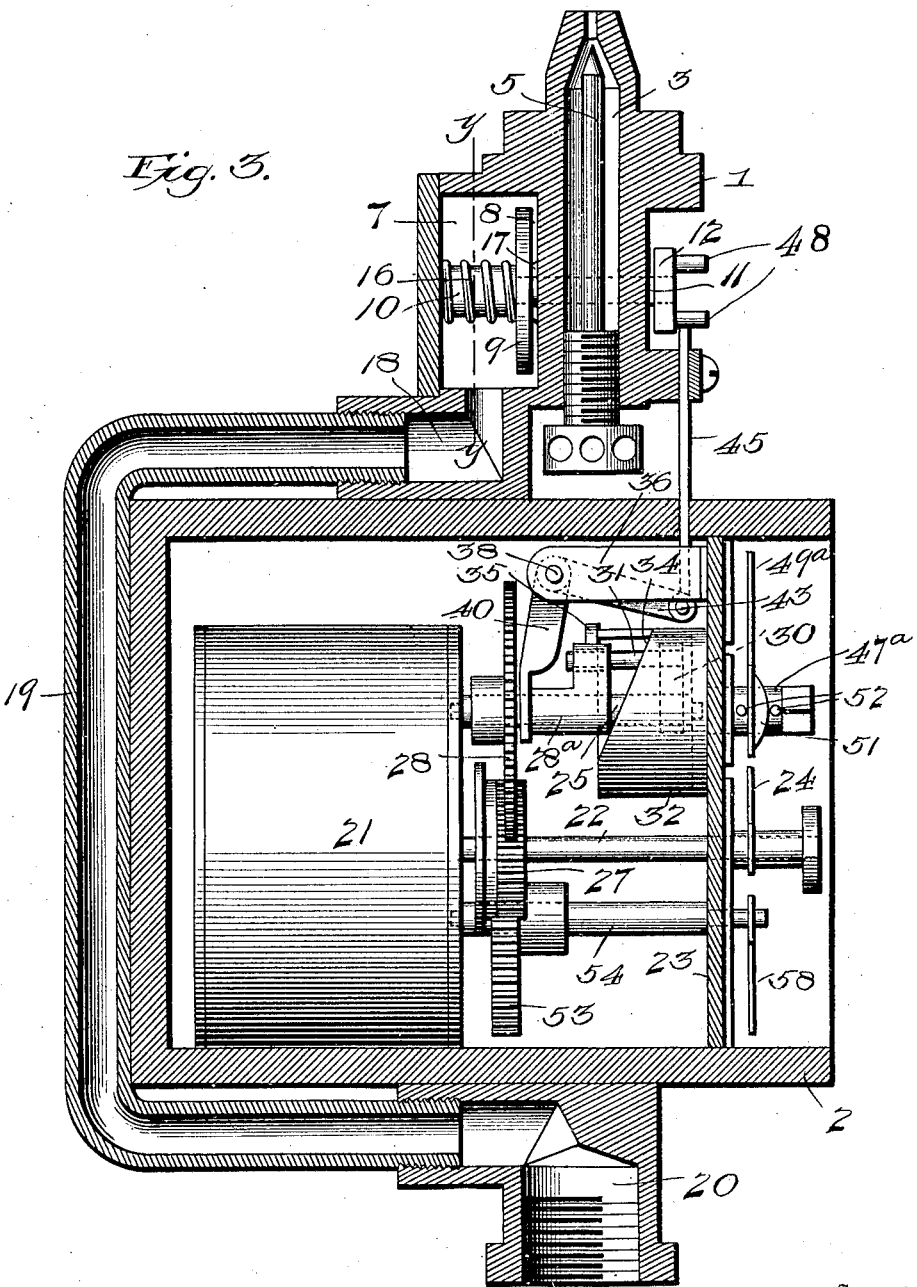
Figure 4:
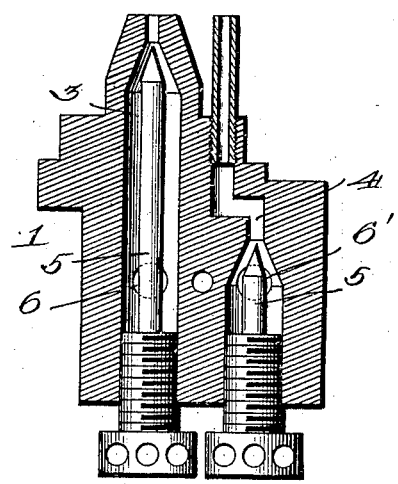
Figure 5:
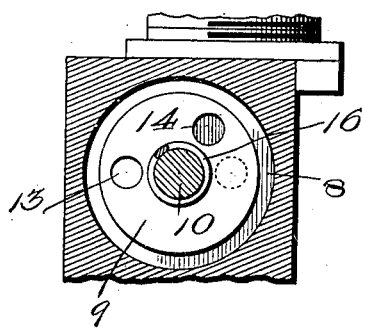
Figure 6:
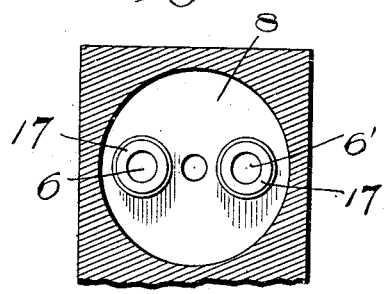
Figure 7:
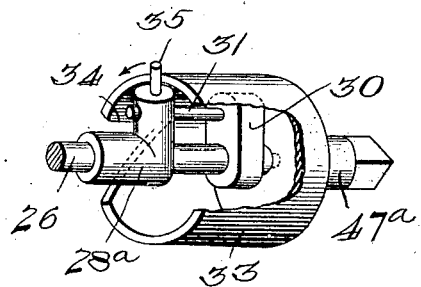
Figure 8:
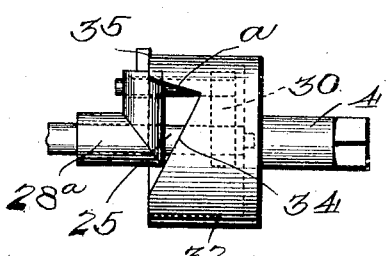
Figure 9:
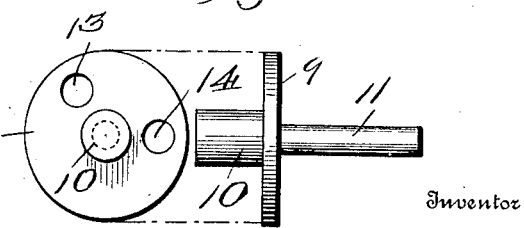

In the drawings illustrating the invention; Figure 1, illustrates the burner, and mechanism casing, as it would appear in front elevation. Fig. 2, is a similar view of the burner and casing, the dial or front plate containing the time markings and their appropriate indicators or pointers, being removed. Fig. 3, is a vertical transverse section taken about on the line $x$—$x$ of Fig. 1, parts of the valve operating mechanism being in elevation. Fig. 4, is a sectional view of the burner taken on the line transverse to the line upon which the burner in Fig. 3 is shown. Fig. 5, is a detail sectional view taken about on line $y$—$y$ of Fig. 3, the valve being shown in elevation. Fig. 6, is a similar section with the valve removed showing more clearly the ports or openings through which communication is established between the gas supply pipe and the main and pilot burners. Fig. 7, is a detail perspective view of one of the cams, the position of which determines the time of lighting and extinguishing the device, the cam-engaging device, shaft and carrier. Fig. 8, is an elevation of the cam and the device operating in conjunction therewith, which serves to open and close the valve through suitable connections with the burner, and the Fig. 9, is a plan and side elevation of the disk valve and its shaft.

Referring to the drawings: numeral 1, designates the burner casting, and 2 a casing for the time or clock mechanism, and the mechanism which in carrying out my invention, I add to the time mechanism.

The burner is formed with two passages therethrough, indicated by the numerals 3 and 4, that designated by 3 being the passage for the main volume of gas or that which is intended for the lighting volume, and that designated by the numeral 4, being for the gas supplying the "pilot". Each passage is closed at its bottom by screws plugs forming part of needle valves 5, which are similar to valves commonly employed in oil or hydrocarbon gas burners.

Numerals 6 and 6' are ports opening into the burner passages, the port 6 being for the admission of the main volume of gas, and 6' for the gas supplying the "pilot". At the rear side of the burner a chamber 7 is provided, one of the walls of which forms a seat 8 for a disk or plate valve 9, mounted rigidly upon a short shaft 10, which shaft is reduced in diameter as indicated by the numeral 11, and passes through the burner casting, where at its forward end it is rigidly connected with a short rocker arm 12, which is operated upon by devices hereinafter described to shift or rock the valve to open one or the other of the ports 6 and 6' to admit or cut off the supply of gas to one or the other of the burner passages as the exigencies of the case may require. The valve 9 has two openings 13 and 14 therethrough, the first being so positioned in the disk as to register at proper times with the port 6, and the latter with the port 6', for the obvious purpose of opening and closing said ports in accordance with the purposes to be accomplished. Interposed between the valve 9 and a rear plate 15, is a spiral spring 16, serving in addition to the gas pressure, to keep the valve always snugly held upon its seat. As shown in Figs. 3 and 6, I preferably build up the metal of the burner casting to a slight degree around each of the ports 6 and 6', as shown at 17, so that the entire surface of the valve will not be in contact with the valve seat, thus reducing friction to a very great degree and rendering the valve readily movable with a slight expenditure of power, when operated upon by the time mechanism.

The numeral 18, designates a rear central extension forming a part of the burner casting. This extension is adapted for the reception of the end of the gas supply pipe 19, which is preferably shaped as shown. To the lower horizontal section of the pipe is secured an internally threaded casting 20, by which the whole device is connected with the gas pipe supplying gas to the street or other lamp.

The casing 2 for the time mechanism fits snugly between the burner casting and the casting 20, and contains a time or clock mechanism of ordinary construction.

The numeral 21 indicates the casing for the clock or time mechanism proper, and as only the hour and minute hand shaft of the clock mechanism is utilized in carrying out this invention, I have not deemed it necessary to show other parts of said mechanism, and therefore this part of the device is shown in elevation.

The numeral 22, designates the hour and minute hand shaft, which I extend considerably toward the front of the casing and give it a bearing near its forward end in the dial plate 23 through which the shaft passes and carries at its forward end a pointer or indicator 24, which will be further described in connection with a description of the dial plate.

Above the shaft 22 and to either side thereof, I rotatably mount two shafts 25 and 26 which have bearings at their rear ends in the front plate of the casing 21, and at their forward ends in a socket provided within two hollow cams which will be presently described. Upon the shafts 25 and 26 and meshing with an hour wheel 27 on the shaft 22 are gear wheels 28 and 29, which are provided with double the number of teeth that are upon wheel 27, and therefore the wheels 28 and 29 will make one revolution in opposite directions while the wheel 27 makes two revolutions. Upon each of the shafts 25 and 26 I slidably mount a cam-engaging-device 28$^a$ shown in perspective and side elevations in Figs. 3, 7 and 8. Each shaft 25 and 26 further carries a rigid carrier 30 comprised in part by a horizontal pin 31, and the pin of each carrier passes through its appropriate slidable cam-engaging-device and causes them to revolve with the shafts 25 and 26.

The numerals 32 and 33 designate hollow cams which are identical in construction, and each is provided with an angular deep portion 34 which when engaged by the pin 35, of one or the other of the cam-engaging-devices causes an operation which results in the lighting or extinguishing of the lamps, according to the pre-arrangement of the parts, as will become apparent in the course of the description.

Above the shafts 25 and 26 and rigidly secured to the dial plate 23 are two brackets 36 and 37 which form bearings for horizontal shafts 38 and 39. Each of the shafts 38 and 39 has rigidly mounted thereon depending arms 40 and 41 of identical construction, each being bifurcated at its lower end as indicated at 42 so that they straddle the shafts 25 and 26 between the wheels 28 and 29, and the cam engaging devices. Each of the shafts 38 and 39 have further mounted thereon arms 43 and 44 which have their forward ends pivotally connected with vertical sliding rods 45 and 46 of identical construction, each terminating in a head 47 adapted to engage one or the other of the pins 48 on the rocker arm 12.

The numeral 49 indicates two spiral springs which surround the shafts 38 and 39 and are so arranged as to exert a constant pressure against the arms 40 and 41 keeping said arms in close contact with the cam-engaging-devices 28, making said devices in turn follow the edge of the cams so that when said devices reach the deep portions of the cams, they will be forced suddenly toward the front of the casing, and through the medium of the arms 43 and 44, raise one or the other of the rods 45 or 46, and thus operate the valve to open or close one or the other of the ports 6 and 6' as the case may require, it being understood that the cams are so located that their deep portions will be reached by the cam-devices at different times, one of said devices being adapted to open the ports to the main burner, and the other to the "pilot".

The cams it will be understood are stationary except when moved for adjustment, that is to say they can be moved or set so that their deep portions will be in proper position to operate the valve at proper intervals. Each cam is provided with a post 47ª squared at its end preferably, to fit a key or other device by which it may be conveniently set, and to the outer ends of these posts suitable pointers or indicators 49ª and 50 are secured, representing in the present instance, as shown more clearly in Fig. 1, the extinguishing pointer or indicator and the lighting pointer or indicator respectively. Interposed between the pointers or indicators are spring plates 51 held in close frictional contact with the front of the dial plate 23 by small pins 52. These plates serve to hold the cams in very close frictional contact with the inner side of the plate, and while the cams may be readily set by the application of considerable force applied to their stems or posts, they will not be affected during the operation of the device by any of the mechanism or devices that engage them.

The numeral 53 designates a wheel in gear with the wheel 29, which revolves once in twenty-four hours. The shaft 54 of said wheel extends through the dial plate 23 where at its forward end it is also provided with a pointer or indicator.

Referring now particularly to Fig. 1, the numeral 55 designates a scale and markings in connection with which the pointer or indicator 49ª is used, which pointer is adapted to be moved by hand, or with a suitable key, and the pointer having connection with the cam which in the present instance, for convenience I will designate the extinguishing cam, indicates the location and the deep portion of the cam, and consequently the time when the light will be extinguished.

The numeral 56, designates a similar scale and markings which bear the same relation to the pointer 50 as the scale 55 bears to the pointer or indicator 49ª, and the location of this last mentioned pointer will indicate the location of a deep portion of its cam 33, and consequently the time when the lamp will be lighted.

The numeral 57, is a dial provided with "A. M." and "P. M." markings, the dial being divided into twenty-four parts of one hour each, representing a whole day, and a hand 58 mounted on the shaft 54 traverses said dial constantly to indicate the hour of the day. Another dial 59 is provided and marked for the minutes of the hour, and it in turn is traversed by a hand 60 mounted on the shaft 22, in the usual manner, and this hand corresponds with the long or minute hand of an ordinary watch or clock.

The dials 57 and 59 are read in connection with each other, the hours from the dial 57, and the minutes from the dial 59, and therefore as shown in the drawing the time indicated by the two dials is twenty-seven minutes after three P. M.

For convenience I have marked the scales 55 and 56 "Extinguish" and "Light" respectively, but it will be understood that this is solely for convenience in description as it is obvious that the mechanism could be just reversed.

The operation of the device is as follows: Assuming that port 13 of the valve 9 be in registry with the port 6 of the main burner, and the port of the pilot burner closed. In this position of the parts the light is burning, and will burn until the pre-determined morning hour is reached for the light to be extinguished which as indicated on the dial is half past four o'clock, and when this time is reached the deep portion of the cam 32 on the shaft 25 will be reached by this particular cam-engaging-device which device will be forced suddenly within the cam and toward the front of the casing by the arm 40, actuated by the spring 49. This movement will in turn through the medium of the shaft 38, arm 43, and rod 45 rock the rocker arm 12 upon its pivot to the position indicated in dotted lines, which movement of the rocker arm will obviously shift the valve until the port 13 is out of registry with the port 6, thus closing these ports and cutting off the supply of gas to the main burner. At the same time the port 14 of the valve will be brought into registry with the port 6' in the burner casting, thus permitting the gas from the main supply pipe to be fed to the pilot which will be lighted from the dying flame from the main burner. It will be understood that this operation is of very short duration, it being practically instantaneous. However should it be found desirable to make the valve work a little more slowly so as to insure the invariable lighting of the pilot, I may form the deep portions of the extinguishing and lighting cams as indicated by the line a Fig. 8. This formation results in a gradual movement of the cam-engaging-devices, and the rapidity of movement will obviously depend upon the degree of inclination of that portion of the cam designated by a, as the operation of opening and closing the valve is not completed until the pins on the cam-engaging-devices reach the extreme limit of the deep portions of the cams.

It is not considered necessary to describe the operation in which the pilot is extinguished and the main burner lighted, as it is obvious from the construction shown and the description given, that the operation would be just reversed. After the extinguishment of the main burner as just described, the cam-engaging-device that has operated to extinguish the light, will revolve slowly out of the deep portion of its particular cam until it reaches the inner edge of said cam, or the position in which it is shown in Fig. 3, when obviously the rod 45 will slowly descend to its normal position, or to the position shown in Fig. 1, leaving the rocker arm 12 in the position shown in dotted lines, and in readiness to be operated upon by the rod 46 when the time comes to again light the lamp.

Claims.

1. A lighting and extinguishing device comprising a burner having main and pilot passages therethrough and inlet openings for the admission of gas to the passages, a valve in said burner adapted to open or close one or the other of said openings, a clockwork mechanism-casing connected with the burner, a clockwork mechanism in said casing, an adjustable lighting, and an adjustable extinguishing cam within the casing, a shaft for each cam suitably mounted in the casing, a cam-engaging-device longitudinally movable on each shaft, connections between the shafts and the time mechanism whereby the said shafts and the cam-engaging-devices are revolved with the shafts, means for holding the cam-engaging-devices in close engagement with the cam surfaces of the cams, and connections between the cam-engaging-devices and the valve in the burner, whereby and in conjunction with the cams, the valve is operated at pre-determined times, substantially as set forth.

2. A lighting and extinguishing device comprising a burner having main and "pilot" passages and openings for the admission of gas to the passages, means for opening and closing one or the other of said openings, in combination with a clockwork mechanism having an adjustable lighting, and an adjustable extinguishing cam, a shaft for each cam, a cam-engaging device co-acting with each cam, connections between the shafts and the time mechanism whereby the same and the cam-engaging devices are revolved together, means for holding the cam-engaging devices in close engagement with the cam surfaces of the cams, and connections between the cam-engaging devices and the opening and closing devices in the burner, whereby and in conjunction with the cams, said opening and closing devices are operated at predetermined times.

3. A lighting and extinguishing device comprising a burner having main and "pilot" passages and inlet openings for the admission of gas to the passages, devices adapted to open or close one or the other of said openings, a clockwork mechanism, an adjustable lighting, and an adjustable extinguishing cam, each having an operating cam surface adapted to effect a comparatively slow opening and closing movement to the opening and closing devices of the burner, whereby one of the lights is relighted before the other is extinguished, a rotating cam-engaging device for each cam, connections between the cam-engaging devices and the opening and closing devices of the burner, whereby and in conjunction with the cams, said opening and closing devices of the burner are operated at predetermined times, substantially as and for the purpose set forth.

4. A lighting and extinguishing device comprising a burner having main and "pilot" passages therethrough, and inlet openings for the admission of gas to the passages, opening and closing devices controlling said openings, a rock-shaft carried by the burner and connected with the devices for controlling the gas passages, an adjustable lighting, and an adjustable extinguishing cam, a cam-engaging device for each cam, operative connections between the cam-engaging devices and a rock-shaft in the burner, in combination with a clockwork mechanism actuating the cam-engaging device, and through them operating the opening and closing devices in the burner.

5. A lighting and extinguishing device comprising a burner having main and "pilot" passages and inlet openings for the admission of gas to said passages, opening and closing devices controlling said opening, a rock-shaft carried by the burner and connected with the devices for controlling the gas passages, an adjustable lighting, and an adjustable extinguishing cam, a cam-engaging device for each cam longitudinally movable with relation to each cam, a bell-crank lever acting in conjunction with each cam-engaging device, and a rod pivoted to each lever adapted to operate through suitable devices upon the opening and closing devices of the burner, in combination with a clockwork mechanism actuating the cam-engaging devices and through them operating the opening and closing devices of the burner, substantially as described.

In testimony whereof I affix my signature in presence of two witnesses.

AUGUST MEYER.

Witnesses:
TITIAN W. JOHNSON,
GEO. W. REA.